United States Patent [19]

Platt

[11] 4,383,553
[45] May 17, 1983

[54] VISBREAKER LETDOWN VALVE

[75] Inventor: Robert J. Platt, Randolph, N.J.

[73] Assignee: Exxon Research and Engineering Co., Florham Park, N.J.

[21] Appl. No.: 312,238

[22] Filed: Oct. 19, 1981

[51] Int. Cl.³ .............................................. F15D 1/08
[52] U.S. Cl. .................................. 138/46; 137/625.4; 166/91; 251/122; 251/124
[58] Field of Search ............... 137/625.4, 330; 138/46; 251/122, 124; 166/92, 91

[56] References Cited

U.S. PATENT DOCUMENTS 2,084,397  6/1937  Hildebrandt ..................... 137/625.4
4,292,991 10/1981  Wing ..................................... 138/46

FOREIGN PATENT DOCUMENTS 245709 11/1979  U.S.S.R. ................................. 166/91

Primary Examiner—Stephen Marcus
Assistant Examiner—Mark Thronson
Attorney, Agent, or Firm—Robert S. Salzman; Donald F. Wohlers

[57] ABSTRACT

A visbreaker, letdown valve is featured which maintains a smooth flow of furnace effluent. Liquid passing through the throat of the valve is throttled, and a portion is caused to flash to vapor. The valve is designed to allow for subsonic flow of the vapor under all process conditions. A quenching fluid is also added to the liquid passing through the throat in order to cool the liquid.

9 Claims, 3 Drawing Figures

VISBREAKER LETDOWN VALVE

FIELD OF THE INVENTION

The invention relates to a letdown valve for visbreaker processing of liquids, and more particularly to a letdown valve which will provide a smooth flow of effluent from a visbreaker furnace.

BACKGROUND OF THE INVENTION

Visbreaking is a thermal cracking process for converting heavy asphalt-like distillates into lighter, more commercial products, such as fuel oil. Visbreaking is accomplished in a furnace operating at pressures of from 400 to 1,600 psig, and temperatures of 700° to 900° F.

Effluent from the furnace is passed through a letdown valve, where the pressure and temperature is drastically reduced. The severe reduction of the pressure and temperature makes extreme requirements upon the design and operation of the letdown valve. If the letdown valve is not designed properly, the flow of the furnace effluent will back-up into the furnace or the valve will fail.

The letdown valve of this invention depressurizes and cools the furnace effluent, and maintains a smooth flow of the liquid such that noise and turbulence are reduced as compared to other valve types.

As the effluent passes through the throat of the valve, the liquid is throttled, and a portion is caused to flash to vapor, the vapor having a greater volume than the liquid, is then the controlling factor in the proper hydrodynamic design of the valve. In order to obtain continuous back-up-free flow, this invention features vapor leaving the outlet of the valve at sub-sonic speed. The invention has designed the outlet diameter of sufficient width to obtain subsonic flow under all process conditions.

The invention also features a unique quenching design for quenching the high temperature liquid.

DISCUSSION OF RELATED ART

To the best of our knowledge, this is the first time an operative letdown valve has been designed for a visbreaker process, wherein a portion of the furnace effluent is throttled to a vapor without incurring normal problems of damaging vibration and noise.

BRIEF SUMMARY OF THE INVENTION

The invention pertains to a visbreaker letdown valve for reducing the pressure of a liquid. The valve comprises in the most basic definition, the following four elements:
means defining a flow path for said liquid;
means defining a valve throat disposed in said flow path, said valve throat throttling said liquid wherein at least a portion of said liquid will flash into vapor;
means defining a high pressure valve inlet upstream of said valve throat; and
means defining a low pressure valve outlet downstream of said valve throat, said valve outlet having a diameter of sufficient width to provide for a subsonic flow of said vapor exiting said letdown valve.

Additionally, the valve comprises a movable plug for controlling the flow of liquid across the throat. The plug is supported and guided within a plug bushing, the plug having channels running therethrough. The channels introduce a quenching fluid into the flow path. The channels are concentrically arranged in the plug, and terminate in curved vents, which direct the quenching fluid outwardly from the plug axis. The quenching fluid is introduced in the bonnet portion of the letdown valve and then passes through the plug.

It is an object of this invention to provide an improved letdown valve for a visbreaking process;

It is another object of the invention to provide a visbreaker letdown valve which introduces quenching fluid into the flow path stream;

It is a further object of this invention to provide a letdown valve for a visbreaker process wherein the furnace effluent is throttled to a vapor in the throat of the valve, and the vapor exits at sub-sonic velocity to prevent effluent from backing-up at the inlet.

These and other objects of this invention will be better understood and will become more apparent with reference to the following detailed description, considered in conjunction with the accompanying drawings.

DETAILED DESCRIPTION OF THE INVENTION

Generally speaking, the invention features a smooth flowing visbreaker letdown valve featuring a quenching and throttling of furnace effluent.

Figure 1:
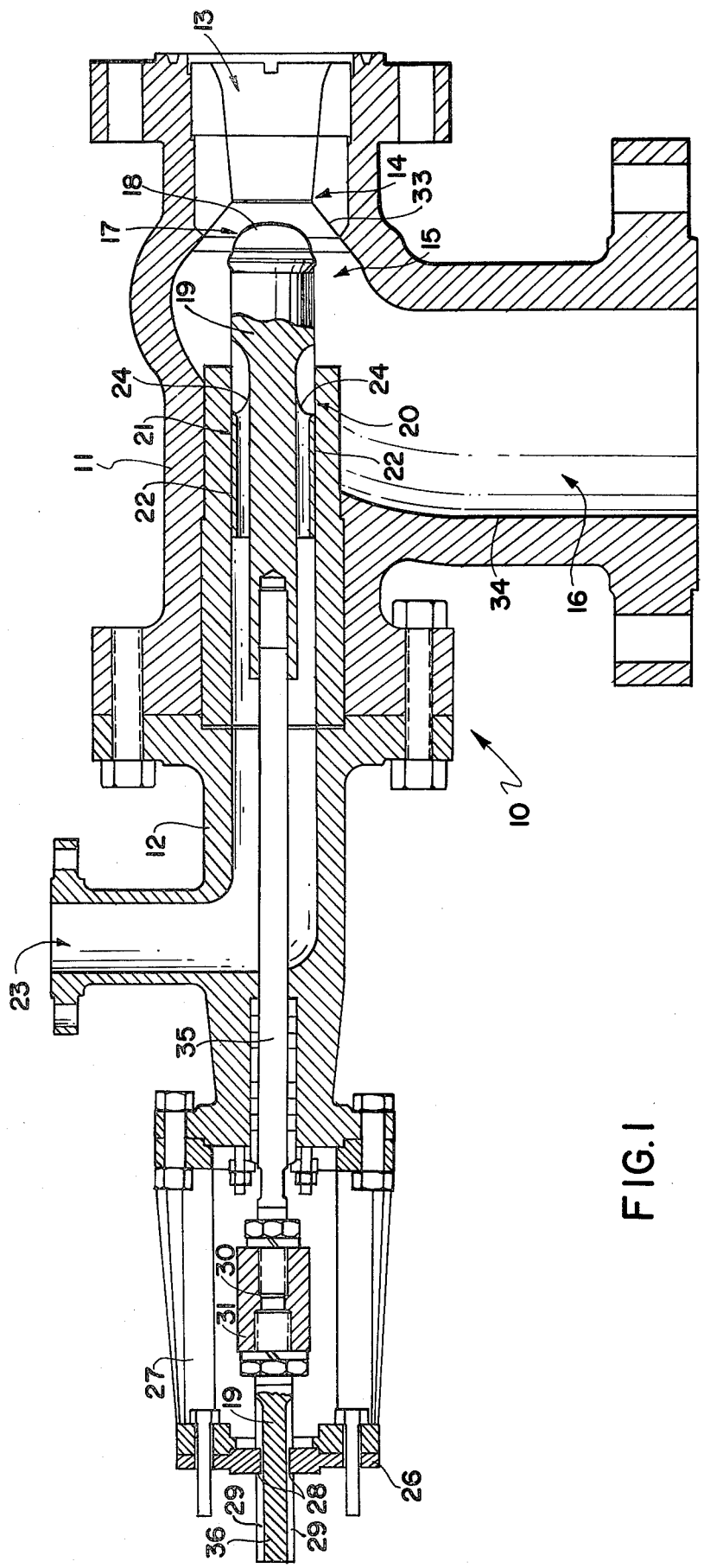
FIG. 1 is a sectional view of the visbreaker letdown valve of this invention.
Figure 2:
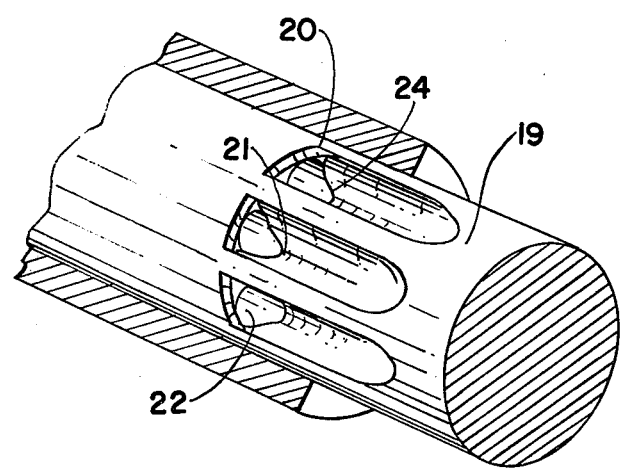
FIG. 2 is a perspective, partial cutaway view of the inventive valve of FIG. 1.
Figure 3:
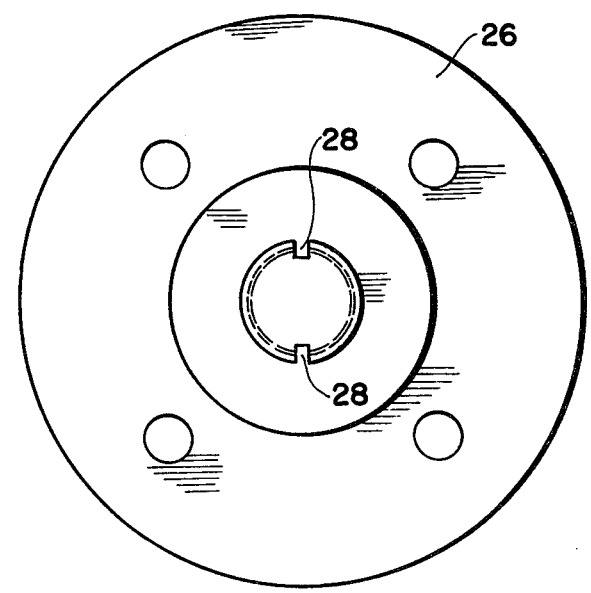
FIG. 3 is a plan view of a rotational restraining plate for the plug of the inventive valve of FIG. 1.

Now referring to FIGS. 1 and 2, a valve 10 is shown having a lower valve body 11 and an upper bonnet section 12.

The lower body section 11 of valve 10 has an inlet 13, which receives the furnace effluent at pressures of between 400 and 1,600 psig and temperatures of approximately 700° to 900° F.

The effluent enters the inlet 13 and is throttled as it flows past throat area 14. The effluent liquid will partially flash into a vapor as it exits the throat area and enters the diffusing area 15 of the valve. The vapor exits the outlet 16 of the valve at sub-sonic velocity due to the wide diameter of outlet 16. It will be noted that the outlet 16 is almost twice the diameter of the inlet 13. The exiting of the vapor and liquid of the effluent from outlet 16 at sub-sonic speed assures that the furnace effluent will not back-up into the furnace. Also, the inventive design insures a steady flow and minimum pressure recovery which is quieter than other similar flow designs.

A movable plug 17 is disposed adjacent the throat area 14, and is used to control the flow across the throat 14. The flow will generally surround the plug 17 as the liquid diffuses upon exiting the throat.

The plug 17 comprises a head portion 18 for controlling flow through the throat area 14 and a shank 19, stem 35, turnbuckle 31 and spindle 36. The shank 19 is guided and supported for movement by a bushing 20. The bushing 20 generally has a length sufficient to support the shank 19 from breaking but not so long that coke build-up on the internal wall surfaces 21 of the bushing 20 will cause binding of the shank 19 against movement. The bushing contact will generally have a length to diameter ratio of approximately 1.5.

The shank 19 has a plurality of channels 22 concentrically arranged, therein, and which run completely through the shank 19. The channels convey quenching fluid from the quenching fluid inlet 23 in the bonnet 12.

The channels each terminate in curved vents 24, which direct the quenching fluid into the diffusing flow path of the furnace effluent.

The plug 17 is generally moved by a gear-reduced motor drive (not shown). In order to prevent the rotation of the spindle 36 as it is moved within the valve body, a retaining ring 26 is bolted in place in a yoke portion 27 of the valve 10, which itself is bolted to bonnet 12.

The retaining ring 26 has two permanent keys 28 which align with keyway groves 29 of spindle 36.

The spindle 36 is joined to the stem 35. A turnbuckle 31 connects the spindle and stem portions of plug 17. This turnbuckle prevents failure of the shank 19 and stem 35 from vibrational causes and allows continuous vertical adjustment of shank length and hence plug contact with the valve seat even when the plug is mounted within the valve.

Both the retaining ring 26 and the turnbuckle 31 prevent undue strain from being exerted upon spindle 36. Such strain was often a cause of failure in earlier designs.

In order to prevent coke build-up and erosion damage to internal diffuser area surfaces, the walls 33 of the diffuser area 15 are coated with Stellite. The outlet walls 34 are coated with tungsten carbide to prevent erosion by the rapidly moving gases and liquid. the head 18 of plug 17 is also coated with Stellite to prevent coke build-up thereon.

Having thus described this invention what is desired to be protected by Letters Patent is presented by the following appended claims.

What is claimed is:

1. A letdown valve for reducing the pressure of a liquid, comprising:
   means defining a flow path for said liquid;
   means defining a valve throat disposed in said flow path, said valve throat throttling said liquid wherein at least a portion of said liquid will flash into vapor;
   means defining a high pressure valve inlet upstream of said valve throat;
   means defining a low pressure valve outlet downstream of said valve throat;
   a movable elongated cylindrical plug disposed adjacent said throat; and
   bushing means including an end portion projecting into said flow path for supporting and guiding said plug for axial movement therein, said plug including a plurality of channels running axially therein for introducing quenching fluid into said flow path, said channels being arranged concentrically in an annular ring within said plug and each having an axis extending parallel to the axis of said plug and wherein each of said channels terminates in a curved vent portion for directing said quenching fluid radially outward into said flow path adjacent said bushing means end portion.

2. The letdown valve of claim 1, wherein said plug includes a stem and spindle, and further including means for preventing said spindle from rotating.

3. The letdown valve of claim 1, wherein said plug includes an elongated stem, and means for adjusting the lift position of said plug.

4. A letdown valve in accordance with claim 1 wherein said valve throat includes a convergent portion upstream of said throat and a divergent portion downstream of said throat.

5. A letdown valve in accordance with claim 4 wherein said plug further includes a convex domed end portion adjacent said throat.

6. A letdown valve for reducing the pressure of a liquid, comprising:
   means defining a flow path for said liquid;
   means defining a valve throat disposed in said flow path, said valve throat throttling said liquid wherein at least a portion of said liquid will flash into vapor;
   means defining a high pressure valve inlet upstream of said valve throat;
   means defining a low pressure valve outlet downstream of said valve throat, said valve outlet having a cross-sectional area relative to said throat area and differential pressure across said valve to provide for a sub-sonic flow of said vapor exiting said letdown valve;
   a movable elongated cylindrical plug disposed adjacent said throat;
   bushing means for supporting and guiding said plug for movement, said plug including a plurality of channels running axially therein for introducing quenching fluid into said flow path, said channels being arranged concentrically in an annular ring within said plug and each having an axis extending parallel to the axis of said plug and wherein each of said channels terminates exteriorly of said bushing means in a curved vent portion for directing said quenching fluid radially outward into said flow path adjacent said bushing means end portion.

7. A letdown valve in accordance with claim 6 wherein said valve includes a convergent portion upstream of said throat and a divergent portion downstream of said throat.

8. A letdown valve in accordance with claim 7 wherein said plug further includes a convex domed end portion positioned adjacent said throat.

9. A visbreaker letdown valve for reducing the pressure of a liquid, comprising:
   means defining a flow path for said liquid;
   means defining a valve throat disposed in said flow path, said valve throat throttling said liquid wherein at least a portion of said liquid will flash into vapor;
   means defining a high pressure valve inlet upstream of said valve throat and including a convergent portion upstream of said throat and a divergent portion downstream of said throat;
   means defining a low pressure valve outlet downstream of said valve throat, said valve outlet having a cross-sectional area relative to said throat area and differential pressure across said valve to provide for a sub-sonic flow of said vapor exiting said letdown valve;
   a moveable enlongated cylindrical plug disposed adjacent said throat;
   bushing means including an end portion projecting into said flow path for supporting and guiding said plug for axial movement therein, said plug including a convex domed end portion adjacent said throat and a plurality of channels running axially therein for introducing quenching fluid into said flow path, said channels being arranged concentrically in an annular ring within said plug and each having an axis extending parallel to the axis of said plug and wherein each of said channels terminates in a curved vent portion for directing said quenching fluid radially outward into said flow path adjacent said bushing means end portion.

* * * * *